United States Patent
Smith et al.

(10) Patent No.: US 8,659,685 B2
(45) Date of Patent: Feb. 25, 2014

(54) METHOD AND APPARATUS FOR CALIBRATING AND CORRECTING SHADING NON-UNIFORMITY OF CAMERA SYSTEMS

(75) Inventors: Scott Smith, Saratoga, CA (US); Robert Black, Milpitas, CA (US)

(73) Assignee: Aptina Imaging Corporation, George Town (KY)

( * ) Notice: Subject to any disclaimer, the term of this patent is extended or adjusted under 35 U.S.C. 154(b) by 1645 days.

(21) Appl. No.: 12/145,794

(22) Filed: Jun. 25, 2008

(65) Prior Publication Data

US 2009/0322892 A1  Dec. 31, 2009

(51) Int. Cl.
*H04N 9/64* (2006.01)
(52) U.S. Cl.
USPC .................. 348/251; 348/187; 348/222.1
(58) Field of Classification Search
USPC .............. 348/180, 187, 188, 222.1, 251
See application file for complete search history.

(56) References Cited

U.S. PATENT DOCUMENTS

| | | | |
|---|---|---|---|
| 7,136,157 B2 | 11/2006 | Gomm et al. | |
| 2003/0016294 A1 | 1/2003 | Chiu | |
| 2004/0212696 A1 | 10/2004 | Tsugita et al. | |
| 2004/0257454 A1 | 12/2004 | Pinto et al. | |
| 2007/0262235 A1 | 11/2007 | Pertsel | |
| 2009/0268053 A1* | 10/2009 | Wang et al. | 348/229.1 |

* cited by examiner

*Primary Examiner* — Nelson D. Hernández Hernández
(74) *Attorney, Agent, or Firm* — Jennifer Luh

(57) ABSTRACT

The invention includes methods and apparatus for correcting shading non-uniformity in camera systems. A method includes capturing at least two sets of flatfield images from at least two sets of camera modules under first and second illuminant, respectively. Pixels for each image in the sets of flatfield images are then averaged to form first and second averaged flatfield images, respectively. The first averaged flatfield image is transformed using the second averaged flatfield image to create a transform image. The transform image is then saved in memory for calibrating the shading non-uniformity of the camera module.

20 Claims, 5 Drawing Sheets

METHOD AND APPARATUS FOR CALIBRATING AND CORRECTING SHADING NON-UNIFORMITY OF CAMERA SYSTEMS

FIELD OF THE INVENTION

The present invention relates generally to camera systems. More particularly, the present invention relates to methods and apparatus for correcting shading non-uniformity in camera systems.

BACKGROUND OF THE INVENTION

Camera systems including an imaging lens and image sensor exhibit a non-uniform image response with a uniform object field input stimulus. Uniformity error is a result of several mechanisms within a camera system including (1) shading following cosine light loss from a lens system across an image field, (2) incident angular dependent pixel response shading in an image sensor, (3) incident angular dependent spectral response of an infrared (IR) filter, (4) spectral or wavelength dependent lens, optical filter, and/or sensor pixel response, and (5) lens-to-sensor misalignment (i.e., pixel micro-lenses with predefined shifts to match lens chief ray angles at an image plane).

Angular and spectral pixel response shading tends to increase as the area dimensions of a pixel decreases and, therefore, correction of non-uniform shading response becomes increasingly important for small image sensor based camera systems. Additionally, lens-to-sensor misalignment tends to require finer tolerances as the pixel size shrinks. Both angular and spectral pixel response shading and lens-sensor misalignment errors lead to the requirement of calibrating each camera module after assembly to restore a uniform output response. This technique of camera shading calibration is referred to herein as module-level shading calibration (MLSC).

An MLSC is generally performed during production of camera modules such that each camera undergoes a flatfield illumination test. Each camera in the production line is exposed to a uniform flatfield illumination source to determine shading calibration values required for the module under test. An MLSC using a single illuminant (fixed spectral response and color temperature) may effectively calibrate shading associated with lens-sensor misalignment, pixel shading, and lens shading.

An MLSC using a single illuminant, A, may not effectively calibrate spectral shading variation that results from illuminating a flatfield scene with a different color temperature illumination source, B, while applying shading calibration values found using illumination source A. Spectral shading variation, or color shading, may appear as a visible artifact in images captured under illumination sources that are different than the production calibration source.

Multiple illumination sources with desired spectral characteristics that match real world illuminants may be used during production in order to find shading calibration values for each expected real world illuminant. The camera may use an illuminant detection algorithm, such as auto white balancing, to select an appropriate shading calibration for use on the current scene.

One difficulty with multiple illuminant MLSCs is the cost increase in the production of camera modules. For example, if five illuminants are required to calibrate spectral shading variation for all real world illumination scenarios, then the production system may require five uniform illumination sources or spectral shift filters. In addition, five flatfield images may be required for capture and stored per camera module to gather sufficient calibration values. Cost increases because of the physical equipment required by the production test system and the increased time spent per camera to capture data. There is a desire, therefore, to perform multiple illuminant MLSCs to correct shading errors and not increase production cost.

DETAILED DESCRIPTION OF THE INVENTION

Referring generally to the figures (FIGS. 1-5), in accordance with an example embodiment, there is provided a method of calibrating shading non-uniformity of several camera modules, each generally designated as 101. The method includes capturing flatfield images, each generally designated as 140. Several sets of flatfield images 140a-n are captured using sets of camera modules 101a-n, respectively, which are illuminated by multiple illuminants 120a-n, respectively.

In the description of the present invention, there is reference to Multiple Illuminant Transform Calibration, or TransCal. TransCal includes a method of capturing flatfield images under selected illuminants (for example, 120a-n) and calculating transform surface images (for example, 160a-n) that enable transformation of the captured flatfield images from an illuminant $A_n$ to a target illuminant $A_m$. As will be explained, the transform surfaces 160a-n may also be denoted as $T_{n,m}$, where n is the illuminant for a captured flatfield and m is a target illuminant. The TransCal may be performed in two phases. The first phase is a pre-production phase where the transform surfaces (for example, 160a-n (e.g., $T_{n,m}$)) are determined. The second phase is an MLSC performed during production using a single selected illuminant (for example, 120a) so that shading calibration values (for example, 180a-n) may be determined. The two phases of TransCal are described in detail below.

Figure 1:
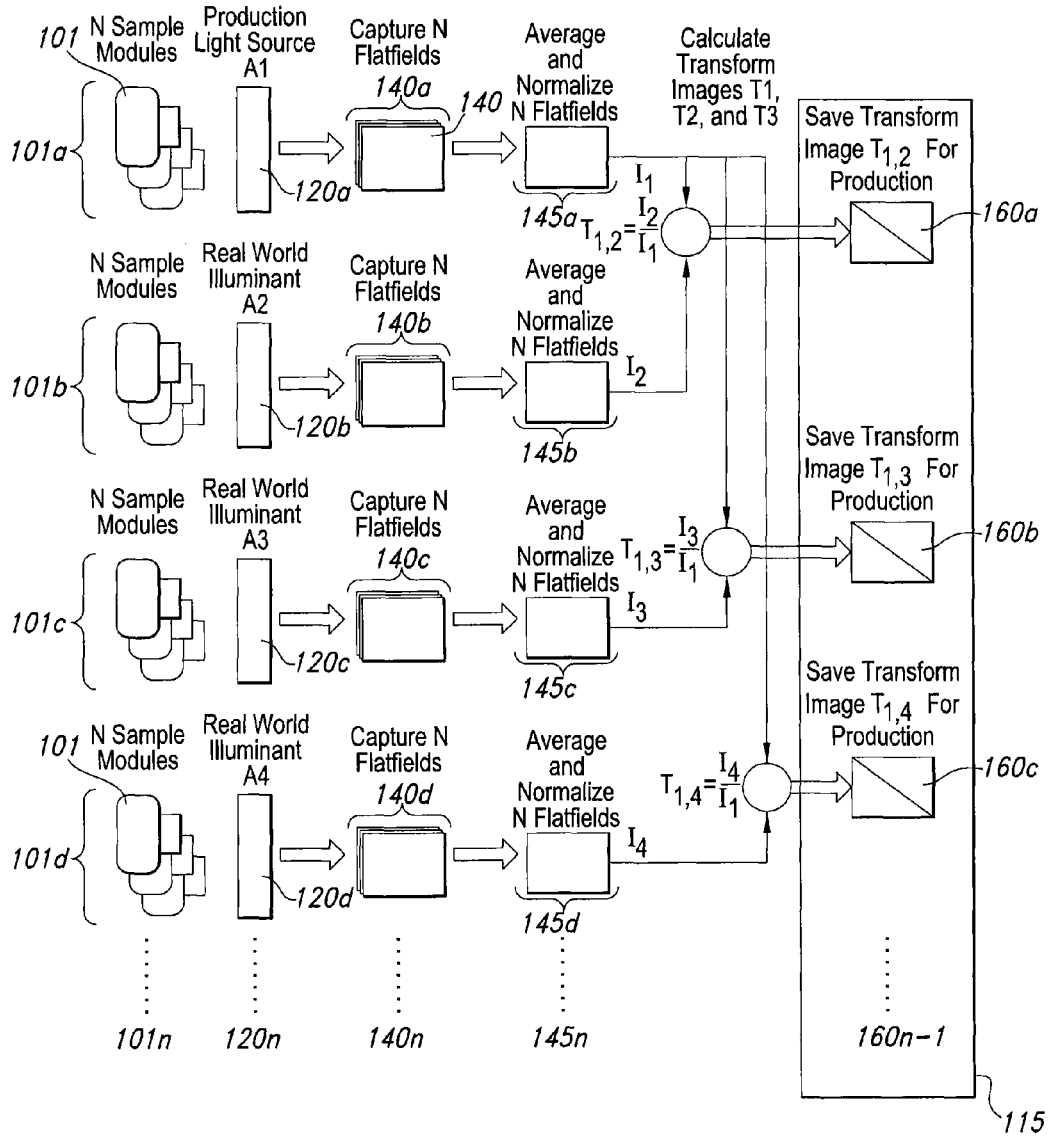
FIG. 1 is an example of a pre-production calibration system for determining transform surfaces in accordance with an embodiment of the present invention.

Referring now to the individual figures, FIG. 1 illustrates a block diagram of the first phase of TransCal, in which transform surfaces 160a-n are obtained based on a single set 101a-n of N camera modules and multiple illuminants 120a-n. The letter "N" denotes a sample number of camera modules 101 selected in each set 101a-n. According to an example embodiment, N may be any sample number having statistical significance. For example, N may be 20 or 30 camera modules 101. It is contemplated, however, that any number of camera modules 101 may be selected. Similarly, multiple sets 101a-n each having N camera modules 101 may be used.

In the example illustrated in FIG. 1, there is shown a single production illuminant 120a (e.g., $A_1$) and three real world target illuminants 120b-d (e.g., $A_2$, $A_3$, and $A_4$). It is contemplated, however, that any number, n, of illuminants may be used. As shown, a single set 101a-n of camera modules 101 are used to capture multiple sets of flatfield images 140a-n under illuminants 120a-n, respectively.

The illuminant 120a, for example, may be passed through a screen or diffuser to spread light uniformly across an image field. By capturing a set of N flatfield images 140a across a uniform light source 120a, for example, shading non-uniformity among N camera modules 101a may be observed. The shading shows up as pixel variation across an individual flatfield 140 in the set of captured flatfields 140a. Next, according to an example embodiment, the multiple sets of N flatfields 140a-n captured, respectively, using multiple illuminants 120a-n, may be averaged across all pixel rows and columns and normalized to provide multiple normalized flatfield images 145a-n. Each normalized flatfield image 145a-n may be represented by row and column pixel values of I, such as $I_1$, $I_2$, $I_3$, $I_4$, . . . $I_n$.

Still referring to FIG. 1, normalized flatfield images 145b-n are transformed using the normalized pixel values $I_1$, of flatfield image 145a. For example, the normalized flatfield images 145b-d (i.e., $I_2$, $I_3$, $I_4$) are each divided by common normalized flatfield image 145a (i.e., $I_1$).

Accordingly, the row and column pixels of normalized flatfield image 145b (i.e., $I_2$) are divided by respective row and column pixels of normalized flatfield image 145a (i.e., $I_1$) to calculate transform image 160a (i.e., $T_{1,2}$). Similarly, the pixels of normalized flatfield image 145c (i.e., $I_3$) is divided by the respective pixels of normalized flatfield image 145a (i.e., $I_1$) to provided transform image 160b (i.e., $T_{1,3}$). Similarly, the pixels of normalized flatfield image 145d (i.e., $I_4$) is divided by the respective pixels of normalized flatfield image 145a (i.e., $I_1$) to provided transform image 160c (i.e., $T_{1,4}$). Thus, pixel-by-pixel division is performed with the pixel values of normalized flatfield image 145a (i.e., $I_1$) in the denominator for each normalized flatfield image 145n (i.e., $I_n$) to generate transformed image 160n-l corresponding to illuminant 120n. The transformed images 160a to 160n-1 (i.e., $T_{1,2}$, $T_{1,3}$, $T_{1,4}$ . . . $T_{1,n}$) are saved in memory (115, FIG. 5) so they may be used later during production as will be explained.

Figure 2:
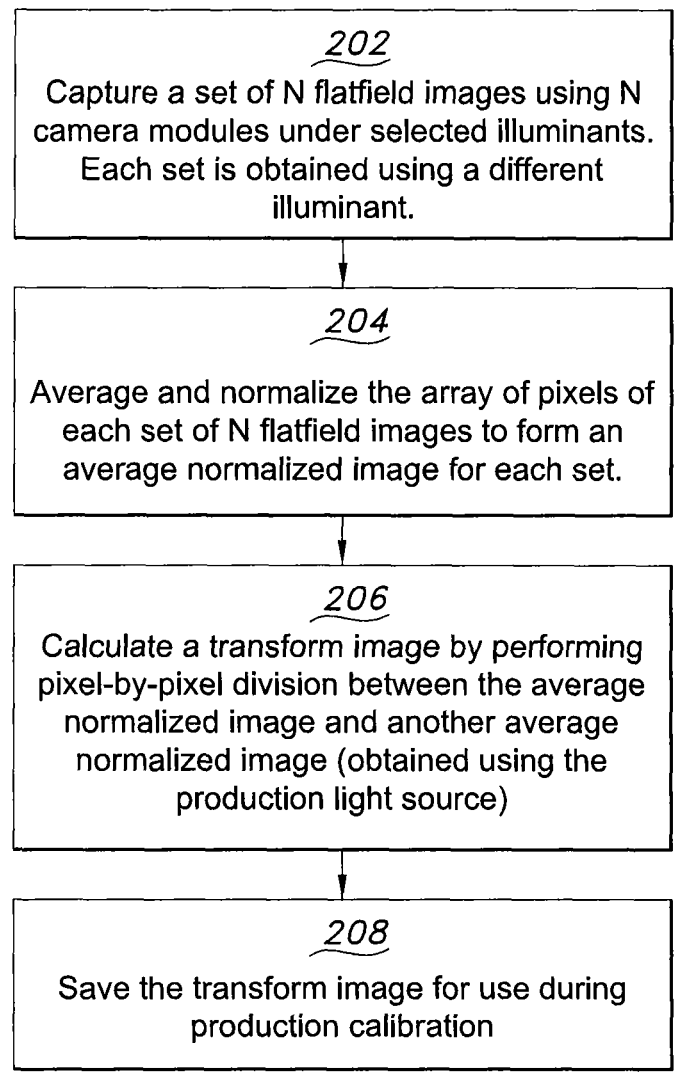
FIG. 2 illustrates an example of a flow chart for determining transform surfaces in accordance with an embodiment of the present invention.

Referring now to FIG. 2, a method 200 describing steps of the first phase of TransCal pre-production calibration is illustrated. The steps, as an example, are described using four illuminants 120a-d (i.e., $A_1$ through $A_4$) shown in FIG. 1.

Step 202: Capture a set of N flatfield images 140a-d using N camera modules 101 under each illuminant 120a-d (i.e., $A_1$ through $A_4$).

Step 204: Average and normalize each set of N flatfield images 140a-d to form an average normalized image 145a-d (i.e., arrays of respective image pixels $I_1$ through $I_4$).

Step 206: Calculate transform images 160a-c (i.e., $T_{1,2}$, $T_{1,3}$, and $T_{1,4}$) by performing pixel-by-pixel division of $I_2/I_1$, $I_3/I_1$, and $I_4/I_1$, respectively.

Step 208: Save transform images 160a-c (i.e., $T_{1,2}$, $T_{1,3}$, and $T_{1,4}$) for use in production.

Figure 3:
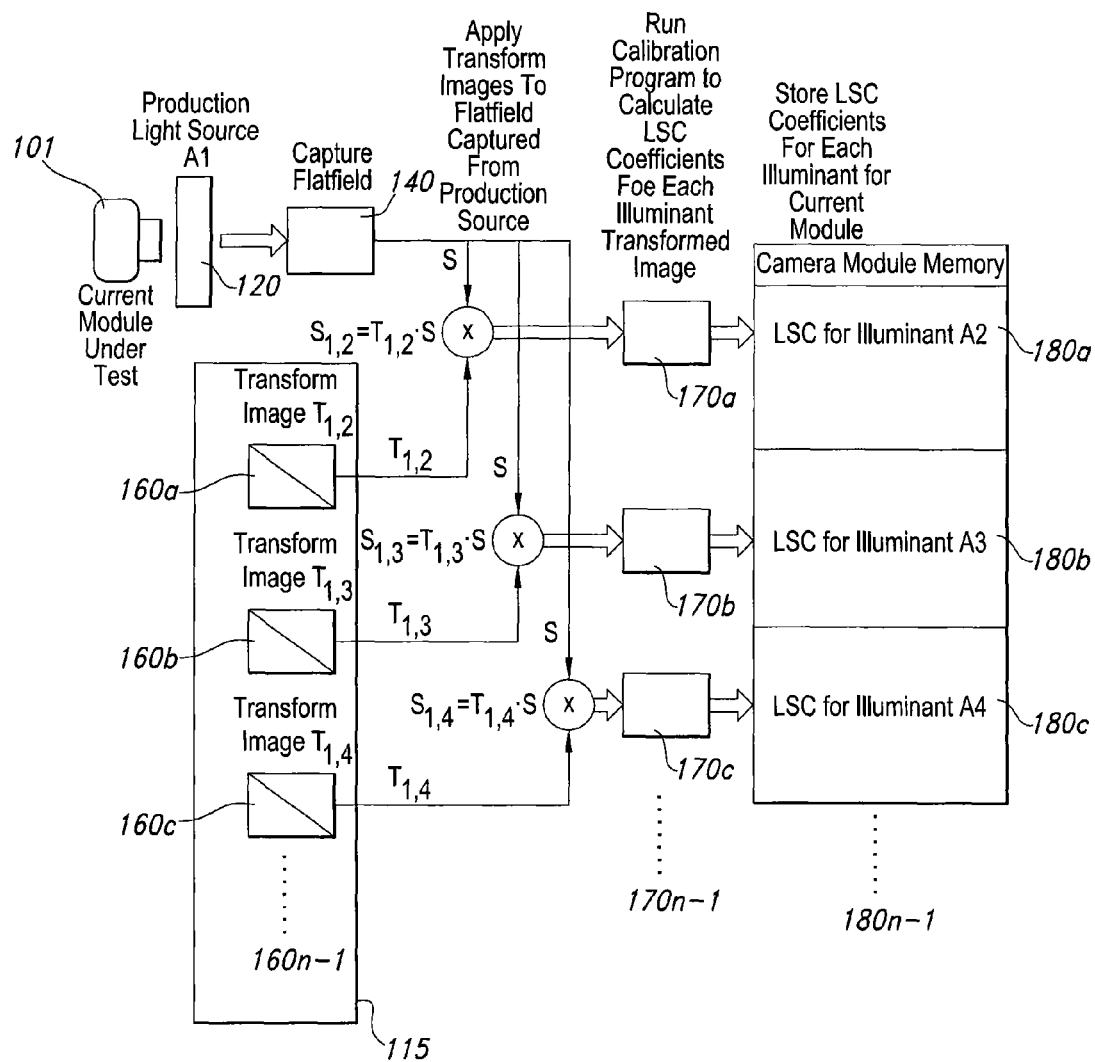
FIG. 3 is an example of a production calibration system for calibrating camera modules in accordance with an embodiment of the present invention.

Referring next to FIG. 3, there is shown a block diagram of phase 2 of TransCal, in which transform images 160a to 160n-l saved during pre-production are used to determine shading values or coefficients 180a to 180n-l. As an example, a production illuminant source 120a (i.e., $A_1$) and three transform images 160a-c (i.e., $T_{1,2}$, $T_{1,3}$, and $T_{1,4}$) are used. It is contemplated that the production illuminant 120a may be any type of illuminant. According to an embodiment, for example, illuminant 120a (i.e., $A_1$) is a white LED, illuminant 120b (i.e., $A_2$) is a standard illuminant "A" 2865K, illuminant 120c (i.e., $A_3$) is a tungsten bulb filtered to D65, and illuminant 120d (i.e., $A_3$) is a Phillips Ultralume U30 fluorescent bulb. It is also contemplated that any number of transform images 160n-l may be used depending on the number of illuminants 120n selected for camera module 101 shading calibration.

Figure 5:
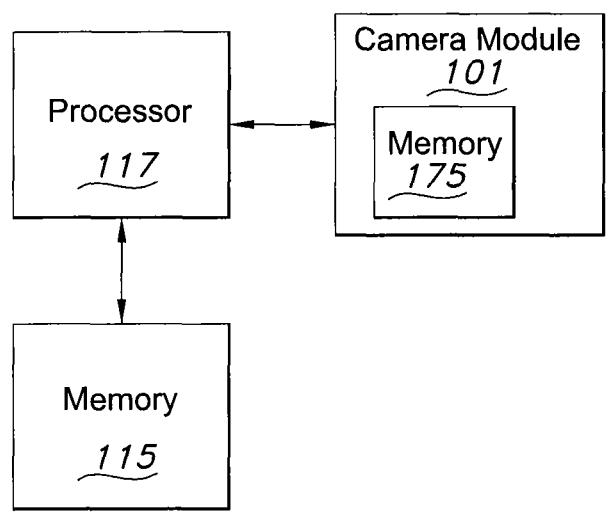
FIG. 5 is an example of a camera module calibration system in accordance with an embodiment of the present invention.

As shown in the illustrated embodiment of FIG. 3, during production and calibration of camera module 101, transform images 160a-c from phase 1 of TransCal are stored into memory 115. A single production illuminant 120 (i.e., $A_1$) is used to capture flatfield image 140 using camera module 101. The row and column pixel data of flatfield image 140 is multiplied by respective row and column pixel data of transform image 160a-c by an inverse transform module. The inverse transform module, for example, may perform a reverse operation of a transform module used in phase 1 of TransCal. According to an example embodiment, the transform module and inverse transform module may be a processor 117 as shown in FIG. 5. Thus, the production illuminant 120 (i.e. $A_1$) may be transformed into images 170a-c (such as virtual images based on the captured flatfield image 140 and each transform image 160a-c) which may then be used to determine shading coefficient values 180a-c of each illuminant 120a-c, respectively.

According to an embodiment, a calibration program may be executed by a processor (117, FIG. 5) to calculate calibration values to be used by the current module under test, i.e., module 101, for each illuminant 120a-c. Thus, shading calibration for multiple illuminants 120a-c may be obtained for use by each camera module 101. After shading calibration values 180a-c have been calculated, they may be stored within a memory (175, FIG. 5) of camera module 101, which is under test.

Figure 4:
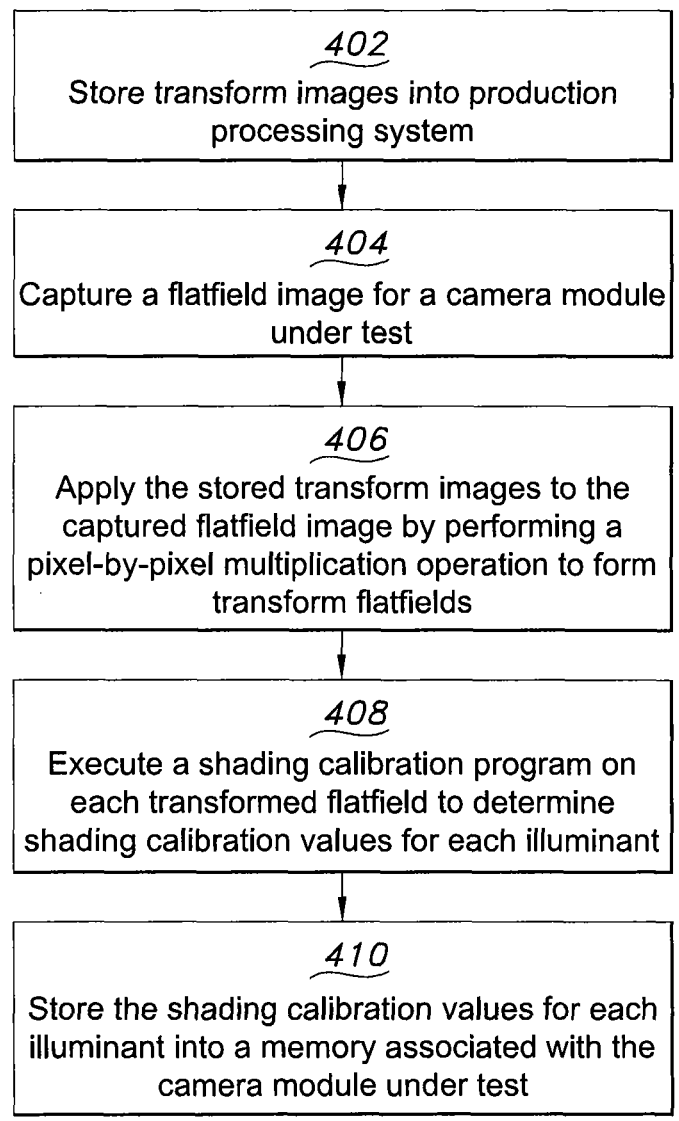
FIG. 4 illustrates another example of a flow chart for calibrating camera modules in accordance with an embodiment of the present invention.

Referring now to FIG. 4, method 400 describing phase 2 of TransCal camera module 101 calibration is illustrated. The steps are described, as an example, using four illuminants 120a-d (i.e., $A_1$ through $A_4$) and three transform images 160a-c (i.e., $T_{1,2}$, $T_{1,3}$, and $T_{1,4}$) obtained during phase 1 of the TransCal.

Step 402: Load transform images 160a-c into production processing system (117, FIG. 5) to be used for calibrating each camera module 101.

Step 404: Capture a flatfield image 140 (i.e., S) for the current camera module 101 under test.

Step 406: Apply the loaded transform images 160a-c (i.e., $T_{1,2}$, $T_{1,3}$, and $T_{1,4}$) to the captured flatfields by performing a pixel-by-pixel multiplication operation to form transformed flatfields 170a-c (i.e., $S_{1,2}=S*T_{1,2}$; $S_{1,3}=S*T_{1,3}$; $S_{1,4}=S*T_{1,4}$).

Step 408: Execute a shading calibration program on each transformed image 170a-c (i.e., $S_{1,2}$, $S_{1,3}$, and $S_{1,4}$) to determine shading calibration values for each desired illuminant condition.

Step 410: Store shading calibration values 180a-c for each image taken under respective illuminants 120b-d (i.e., $A_2$, $A_3$, and $A_4$) into memory (175, FIG. 5) associated with the current camera module 101 (a memory such as an EEPROM or other non-volatile memory).

Referring next to FIG. 5, after the steps above are completed for camera module 101 under test, memory 175 of the camera module 101 will contain shading calibration data 180a-c that may be used by camera 101 to correct shading non-uniformity under real world illuminants 120b-d (i.e., $A_2$, $A_3$, and $A_4$). As described above, any number of real world illuminants 120n may be used to obtain calibration values 180n-l.

Thus, the present invention advantageously results in reduced system cost for production by using only a single illumination source on a production camera and provides accurate shading corrections for multiple illumination sources.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of calibrating shading non-uniformity of a camera module comprising the steps of:
   capturing at least two sets of flatfield images from at least two sets of camera modules under first and second illuminant, respectively;
   averaging an array of pixels of the at least two sets of flatfield images to form first and second averaged flatfield images, respectively;
   transforming the first averaged flatfield image using the second averaged flatfield image to create at least one transform image; and
   saving the one transform image in a memory for calibrating the shading non-uniformity of the camera module, wherein the transforming step includes performing a pixel-by-pixel division operation by dividing all row and column pixels of the first averaged flatfield image by respective row and column pixels of the second averaged flatfield image.

2. The method of claim 1, further comprising normalizing the first and second average flatfield image to form first and second normalized flatfield images, respectively.

3. The method of claim 1, further comprising capturing a third set of flatfield images from at least a third set of camera modules under a third illuminant.

4. The method of claim 3, further comprising averaging an array of pixels of the third set of flatfield images to form a third averaged flatfield image.

5. The method of claim 4, further comprising transforming the first averaged flatfield image with the third averaged flatfield image to form a second transform image.

6. The method of claim 5, further comprising saving the second transform image in the memory.

7. The method of claim 4, wherein the averaging step includes averaging all row and column pixels of each flatfield image in the third set of flatfield images.

8. The method of claim 5, wherein the transforming step includes performing a pixel-by-pixel division operation by dividing all row and column pixels of the first averaged flatfield image by respective row and column pixels of the third averaged flatfield image.

9. A method of calibrating shading non-uniformity of a selected camera module comprising the steps of:
   loading at least one transform image obtained under a first illuminant into a production processing system;
   capturing a flatfield image under a second illuminant by a camera module;
   applying the at least one transform image to the captured flatfield image to obtain a transformed flatfield image; and
   using the at least one transformed flatfield image to obtain a shading calibration values for the first illuminant, wherein the applying step includes multiplying the at least one transform image by the flatfield image.

10. The method of claim 9, further comprising storing the shading calibration value for the first illuminant into a memory of the camera module.

11. The method of claim 9, wherein the capturing step includes diffusing the second illuminant uniformly across a diffuser.

12. The method of claim 9, wherein multiplying the at least one transform image by the flatfield image comprises performing a pixel-by-pixel multiplication operation by multiplying all row and column pixels of each transform image loaded into the production processing system by all row and column pixels of the flatfield image.

13. A camera module calibration system comprising:
   a camera module for capturing a flatfield image under a first illuminant;
   a processor for receiving a transform image including information on a second illuminant, the processor including a multiplier for multiplying the transform image with the flatfield image to obtain a transformed image including information on the second illuminant; and
   a calibration program for obtaining calibration values for the camera module under the second illuminant.

14. The camera module calibration system of claim 13, further comprising a memory for storing transform images including information on at least a third illuminant.

15. The camera module calibration system of claim 14, wherein the processor is configured to perform a pixel-by-pixel multiplication operation by multiplying all row and column pixels of each transformed image by all row and column pixels of the flatfield image.

16. The camera module calibration system of claim 13, wherein the processor is configured to execute the calibration program to obtain calibration values for at least one illuminant.

17. The camera module calibration system of claim 16, wherein the processor is configured to store the calibration values for the at least one illuminant in a memory of the camera module.

18. A camera module calibration system including:
   a first set of camera modules for capturing a first set of flatfield images under a first illuminant;
   a second set of camera modules for capturing a second set of flatfield images under a second illuminant;
   a transform module for obtaining a transform image including information on the first and second illuminants;
   a camera under test for capturing a test flatfield image under the first illuminant; and
   an inverse transform module for obtaining a virtual image taken under the second illuminant, based on the test flatfield image and the transform image.

19. The camera module calibration system of claim 18, wherein the transform module is configured to perform a pixel-by-pixel division operation by dividing all row and column pixels of a first normalized flatfield by all row and column pixels of a second normalized flatfield.

20. The camera module calibration system of claim 18, wherein the inverse transform module is configured to perform a pixel-by-pixel multiplication operation by multiplying all row and column pixels of the test flatfield image by all row and column pixels of the transform image to obtain the virtual image.

* * * * *